(12) United States Patent
Gupta et al.

(10) Patent No.: US 9,215,685 B2
(45) Date of Patent: Dec. 15, 2015

(54) POSITION ESTIMATION VIA PROXIMATE FINGERPRINTS

(71) Applicants: Rajarshi Gupta, Sunnyvale, CA (US); Nayeem Islam, Palo Alto, CA (US); Saumitra Mohan Das, San Jose, CA (US); Ayman Fawzy Naguib, Cupertino, CA (US); Te-Won Lee, San Diego, CA (US)

(72) Inventors: Rajarshi Gupta, Sunnyvale, CA (US); Nayeem Islam, Palo Alto, CA (US); Saumitra Mohan Das, San Jose, CA (US); Ayman Fawzy Naguib, Cupertino, CA (US); Te-Won Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/624,185

(22) Filed: Sep. 21, 2012

(65) Prior Publication Data
US 2013/0079033 A1 Mar. 28, 2013

Related U.S. Application Data

(60) Provisional application No. 61/538,763, filed on Sep. 23, 2011.

(51) Int. Cl.
*H04W 24/00* (2009.01)
*H04W 64/00* (2009.01)
*G01S 5/02* (2010.01)

(52) U.S. Cl.
CPC .............. *H04W 64/00* (2013.01); *G01S 5/0252* (2013.01)

(58) Field of Classification Search
CPC ... H04W 64/00; H04W 4/02; H04L 29/08657
USPC .......... 455/456.2, 456.1, 404.2, 422.1, 414.1, 455/421, 423
See application file for complete search history.

(56) References Cited

U.S. PATENT DOCUMENTS

| | | | |
|---|---|---|---|
| 6,175,308 B1 | 1/2001 | Tallman et al. | |
| 6,256,500 B1 * | 7/2001 | Yamashita | 455/441 |
| 6,694,147 B1 * | 2/2004 | Viswanath et al. | 455/517 |
| 7,962,155 B2 | 6/2011 | Ghosh | |
| 2005/0037775 A1 * | 2/2005 | Moeglein et al. | 455/456.1 |
| 2008/0231511 A1 * | 9/2008 | Montuno et al. | 342/387 |
| 2009/0105950 A1 | 4/2009 | Arteaga et al. | |
| 2011/0010093 A1 | 1/2011 | Partridge et al. | |

(Continued)

FOREIGN PATENT DOCUMENTS

| | | |
|---|---|---|
| DE | 102009047242 A1 | 6/2011 |
| JP | 2011158460 A | 8/2011 |

(Continued)

OTHER PUBLICATIONS

Rowe, A. et al.: "Using micro-climate sensing to enhance RF localization in assisted living environments," Carnegie Mellon University, Pittsburgh, PA. IEEE International Conference on Systems, Man and Cybernetics, 2007. ISIC. Oct. 7-10, 2007, pp. 3668-3675, Abstract; Figures 1 & 6 and Section IV.

(Continued)

*Primary Examiner* — Nghi H Ly
(74) *Attorney, Agent, or Firm* — Berkeley Law & Technology Group, LLP

(57) ABSTRACT

Example methods, apparatuses, or articles of manufacture are disclosed herein that may be utilized, in whole or in part, to facilitate or support one or more operations or techniques for position estimation via one or more proximate fingerprints for use in or with a mobile communication device.

40 Claims, 7 Drawing Sheets

(56) References Cited

U.S. PATENT DOCUMENTS

2011/0117924 A1   5/2011   Brunner et al.
2011/0207474 A1   8/2011   Hazzani et al.

FOREIGN PATENT DOCUMENTS

| WO | 2010109361 A1 | 9/2010 |
| WO | WO2010106530 A2 | 9/2010 |
| WO | WO-2011064302 A1 | 6/2011 |

OTHER PUBLICATIONS

International Search Report and Written Opinion—PCT/US2012/056716—ISA/EPO—Dec. 17, 2012.

* cited by examiner

POSITION ESTIMATION VIA PROXIMATE FINGERPRINTS

CROSS-REFERENCE TO RELATED APPLICATIONS

The present application claims priority under 35 U.S.C. §119 to U.S. Provisional Application Ser. No. 61/538,763, entitled "Method and Apparatus for Position Estimation," filed on Sep. 23, 2011, which is assigned to the assignee hereof and which is expressly incorporated herein in its entirety by reference.

BACKGROUND

1. Field

The present disclosure relates generally to position estimation techniques and, more particularly, to position estimation for use in or with mobile communication devices.

2. Information

Mobile communication devices, such as, for example, cellular telephones, portable navigation units, laptop computers, personal digital assistants, or the like are becoming more common every day. Certain mobile communication devices, such as, for example, location-aware cellular telephones, smart telephones, or the like may assist users in estimating their geographic locations by providing position information obtained or gathered from various systems. For example, in an outdoor environment, certain mobile communication devices may obtain a position estimate or so-called "position fix" by acquiring wireless signals from a satellite positioning system (SPS), such as the global positioning system (GPS) or other like Global Navigation Satellite Systems (GNSS), cellular base station, location beacon, or the like via a cellular telephone or other wireless communications network. In some instances, received wireless signals may be processed by or at a mobile communication device, and its location may be estimated using known techniques, such as, for example, Advanced Forward Link Trilateration (AFLT), base station identification, or the like.

In an indoor environment, some mobile communication devices may be unable to reliably receive or acquire satellite or like wireless signals to facilitate or support one or more position estimation techniques. For example, signals from an SPS or other wireless transmitters may be attenuated or otherwise affected in some manner (e.g., insufficient, weak, fragmentary, etc.), which may at least partially preclude their use for position estimations. As such, in an indoor environment, different techniques may be employed to enable navigation or location services. For example, a mobile communication device may obtain a position fix by measuring ranges to three or more terrestrial wireless access points positioned at known locations. Ranges may be measured, for example, by obtaining a Media Access Control identifier (MAC ID) address from wireless signals received from suitable access points and measuring one or more characteristics of received signals, such as signal strength, round trip delay, or the like.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1A:
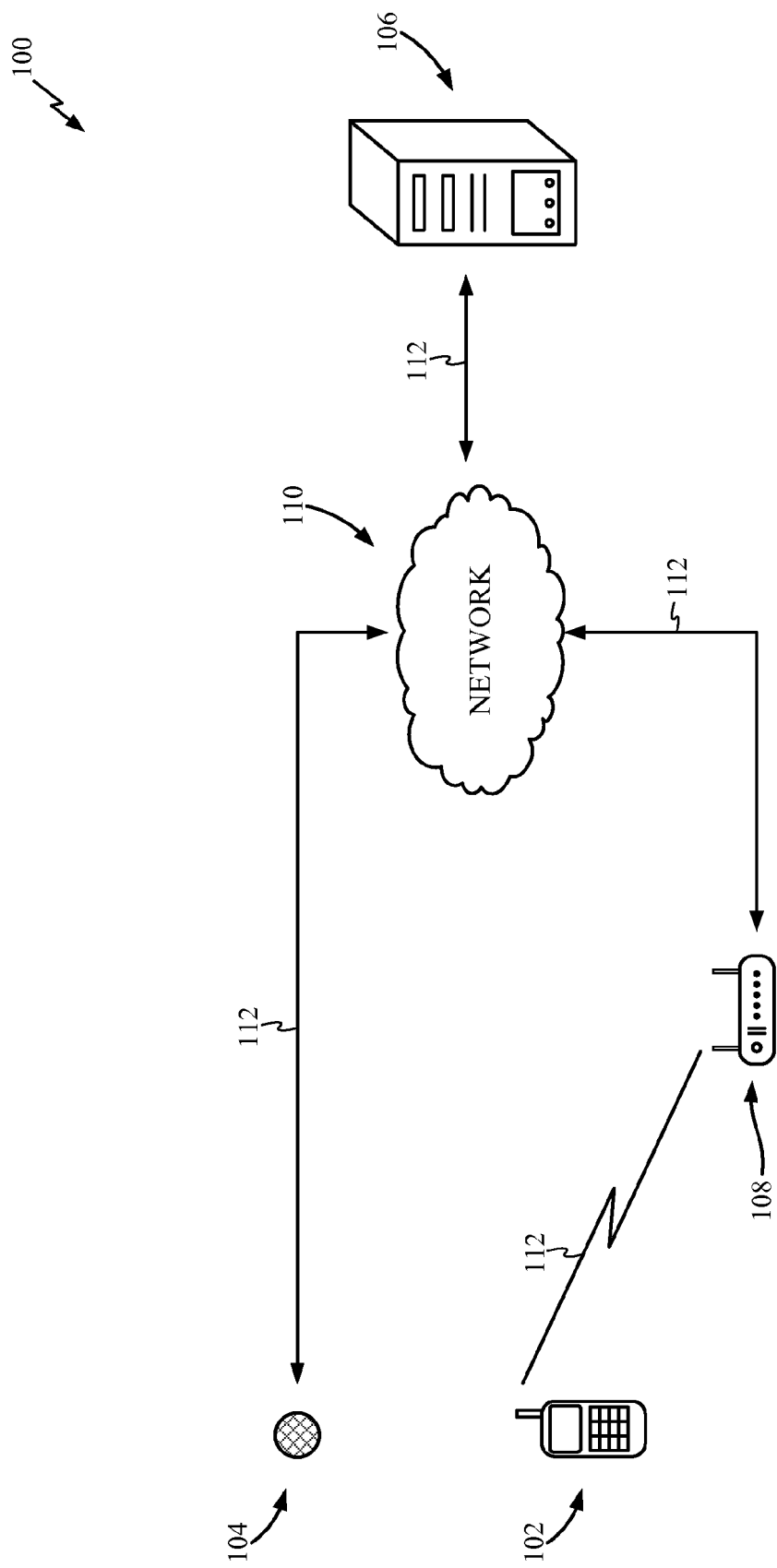
FIGS. 1A through 1C are schematic diagrams illustrating implementations of certain features associated with an example operating environment.

Example implementations relate to position estimation via one or more proximate fingerprints for use in or with a mobile communication device. In one implementation, a method may comprise receiving characteristics of first signals generated by one or more environmental sensors at a mobile device; receiving characteristics of second signals generated by one or more environmental sensors at a reference device at a known location; comparing the characteristics of the first signals with the characteristics of the second signals that were generated substantially contemporaneously; and determining that the mobile device is at least proximate to the known location based, at least in part, on the comparison.

In another implementation, a method may comprise receiving measurements from two or more environmental sensors of a mobile device; receiving measurements from two or more environmental sensors of each of a plurality of reference devices having a known location; comparing the measurements from the mobile device with the measurements from at least two of the plurality of reference devices that were generated substantially contemporaneously; and determining an approximate location of the mobile device based, at least in part, on the comparison in connection with a proximity measure associated with the measurements from the mobile device.

In yet another implementation, an apparatus may comprise means for receiving characteristics of first signals generated by one or more environmental sensors at a mobile device; means for receiving characteristics of second signals generated by one or more environmental sensors at a reference device at a known location; means for comparing the characteristics of the first signals with the characteristics of the second signals that were generated substantially contemporaneously; and means for determining that the mobile device is at least proximate to the known location based, at least in part, on the comparison.

In yet another implementation, an apparatus may comprise a communication interface; and a processor to compare measurements from two or more environmental sensors of a mobile device with measurements from two or more environmental sensors of each of a plurality of reference devices having a known location that were generated substantially contemporaneously, the measurements being received at the communication interface; and to determine an approximate location of the mobile device based, at least in part, on the comparison in connection with a proximity measure associated with the measurements from the mobile device.

In yet another implementation, an article may comprise a non-transitory storage medium having instructions stored thereon executable by a special purpose computing platform at a mobile device to compare characteristics of first signals generated by one or more environmental sensors at the mobile device with characteristics of second signals generated by one or more environmental sensors at a reference device at a known location that were generated substantially contemporaneously; and to determine that the mobile device is at least proximate to the known location based, at least in part, on the comparison.

In yet another implementation, an apparatus may comprise a communication interface; and a processor to receive characteristics of first signals generated by one or more environmental sensors at a mobile device; receive characteristics of second signals generated by one or more environmental sensors at a reference device at a known location; compare the characteristics of the first signals with the characteristics of the second signals that were generated substantially contemporaneously; and determine that the mobile device is at least proximate to the known location based, at least in part, on the comparison.

In yet another implementation, an article may comprise a non-transitory storage medium having instructions stored thereon executable by a special purpose computing platform to compare characteristics of first signals generated by one or more environmental sensors at a mobile device with characteristics of second signals generated by one or more environmental sensors at a reference device at a known location, wherein the first signals were generated substantially contemporaneously with the second signals; and determine that the mobile device is at least proximate to the known location based, at least in part, on the comparison.

It should be understood, however, that these are merely example implementations, and that claimed subject matter is not limited to these particular implementations.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be implemented, in whole or in part, to facilitate or support one or more operations or techniques for position estimation via one or more proximate fingerprints for use in or with a mobile communication device. As used herein, "mobile communication device," "wireless device," or the plural form of such terms may be used interchangeably and may refer to any kind of special purpose computing platform or apparatus that may from time to time have a position or location that changes. In some instances, a mobile communication device may, for example, be capable of communicating with other devices, mobile or otherwise, through wireless transmission or receipt of information over suitable communications networks according to one or more communication protocols. As a way of illustration, special purpose mobile communication devices, which may herein be called simply mobile devices, may include, for example, cellular telephones, satellite telephones, smart telephones, personal digital assistants (PDAs), laptop computers, personal entertainment systems, tablet personal computers (PC), personal audio or video devices, personal navigation devices, or the like. It should be appreciated, however, that these are merely illustrative examples of mobile devices that may be utilized in connection with position estimation via one or more proximate fingerprints, and that claimed subject matter is not limited in this regard.

As previously mentioned, a mobile device may comprise one or more environmental sensors that may provide measurement signals to a suitable processor, such as an application processor, for example, to facilitate or support one or more position or location estimation operations or techniques. The terms "position" and "location" may be used interchangeably herein. Typically, although not necessarily, sensors may be capable of converting physical phenomena into analog or digital signals and may be integrated into (e.g., built-in, etc.) or otherwise supported by (e.g., stand-alone, etc.) a mobile device. For example, a mobile device may feature one or more radio frequency (RF) receivers, magnetometers, ambient light detectors, camera imagers, microphones, temperature sensors, atmospheric pressure sensors, or the like capable of measuring various states, positions, orientations, ambient environments, etc. with respect to the mobile device. The above sensors as well as sensors not listed may be utilized individually, for example, or may be used in combination with other sensors, depending on an application, environment, position estimation approaches, or the like.

In some instances, sensors may, for example, be capable of obtaining or generating one or more characteristics or signatures of wireless signals or signal "fingerprints" that may be matched or compared with expected or previously measured fingerprints at known locations to estimate a position of a mobile device. Thus, at times, a position of a mobile device may be estimated via heat map signature matching, for example, in which current or live characteristics or signatures of wireless signals received or obtained by one or more sensors featured on the mobile device are compared with expected or previously measured signal characteristics stored as heat map values in a database. For example, during an off-line stage, a particular indoor area may be surveyed, and heat map values, such as in the form of observed characteristics of wireless signals indicative of received signal strength (e.g., RSSI, etc.), round-trip delay times (e.g., RTT, etc.), or the like may be collected or compiled. Typically, although not necessarily, signal fingerprints or simply fingerprints may be compiled via one or more appropriate techniques, such as, for example, location fingerprinting, ray tracing, or the like.

Fingerprints may, for example, be stored in a memory of a mobile device, location database, etc. as suitable heat map values (e.g., RSSI, RTT, etc.) that may be referenced during an on-line stage by the mobile device. During an on-line stage, a mobile device may utilize heat map values, such as stored in a local memory or provided to the mobile device via a local server, for example, for matching against current or live signal signatures. By finding a signature in a database that more closely matches characteristics exhibited by signals currently received at a mobile device, a location associated with a matching signature may be used as an estimated location of the device. In some instances, however, in larger indoor areas with multiple access points or feasible routes, for example, heat maps may be quite voluminous or comprehensive and, as such, may tax available bandwidth in wireless communication links, capacity of communication networks, memory space on mobile devices, or the like. Also, once constructed, heat maps may be relatively difficult or expensive to update or reconstruct due, at least in part, to a relatively dynamic environment associated with a corresponding physical location. Furthermore, because location fingerprinting, ray tracing, etc. may involve extensive site surveys as well as significant measurements of multiple parameters for each of a plurality of grid points, these techniques may be labor-intensive, time-consuming, or, at times, prohibitively expensive.

In addition, heat maps are typically, although not necessarily, created or constructed for a particular location once and, as such, may have a relatively limited temporal validity. With time, previously measured signal fingerprints may, for example, often be outdated due, at least in part, to environmental dynamics or changes in a surrounding environment. To illustrate, varying temperatures, humidity levels, number of people present, indoor microclimate shifts due to opening or closing of doors or windows, or like dynamics of an environment may influence signal characteristics to an extent where effectiveness of a heat map may be significantly reduced or nullified. In other words, in a relatively dynamic signal environment, characteristics of wireless signals (e.g., RSSI, RTT, etc.) measured at one point in time may not accurately predict or correspond to like characteristics (e.g., RSSI, RTT, etc.) at other times. As a result, heat map-captured dependency between reference points and estimated locations may be less useful or reliable in real or near real time. In this context, "real time" may refer to an amount of timeliness of information or signals, which may have been delayed by an amount of time attributable to electronic communication or other signal processing. Further, the addition or subtraction of signal sources may also affect a signal environment. Since it may be relatively difficult or expensive to continually update or recreate heat map values to account for dynamic aspects of an environment at any given time, a heat map-dependent localization accuracy may deteriorate significantly over time. Accordingly, it may be desirable to develop one or more methods, systems, or apparatuses that may enable location or navigation services in a relatively dynamic signal environment in an effective or efficient manner.

As discussed below, in an implementation, rather than comparing currently observed or live signal characteristics with static fingerprints of a heat map, current signal characteristics may, for example, be matched against one or more proximate fingerprints that were obtained or generated substantially contemporaneously. As used herein, "contemporaneously" may refer to a concept of a mutual temporal reference with respect to two or more signals existing or occurring in substantially the same period of time. In some instances, a mutual temporal reference may comprise, for example, a signaling sequence in which two or more signals may differ in the amount of time attributable to electronic communication or other signal processing. In some instances, contemporaneous signals may be measured or received at substantially the same time, such as within 50 milliseconds or less, a second, a minute, an hour, or a day, for example, of each other. Claimed subject matter is not so limited, of course. At times, a proximate fingerprint, such as a fingerprint obtained at or generated substantially contemporaneously by a reference device that is proximate to a mobile device is likely to be more accurate or reflective of a current environment than a static heat map fingerprint. A proximate fingerprint may, for example, be obtained at or generated by an environmental sensor of a proximate reference device positioned at a known location and, as such, may help to account for changes in characteristics of wireless signals of surrounding propagation space.

As previously mentioned, a signal fingerprint may comprise, for example, one or more suitable characteristics or signatures of wireless or like signals capable of being obtained at or generated by one or more sensors of a mobile device, reference device, or the like. As a way of illustration, a fingerprint may comprise, for example, one or more signaling (e.g., RSSI, etc.), timing (e.g., RTT, etc.), or like characteristics of wireless signals, though claimed subject matter is not so limited. For example, at times, an acoustic fingerprint, temperature fingerprint, ambient light fingerprint, or the like may be utilized, in whole or in part. In some instances, a signal fingerprint may comprise, for example, a time-varying fingerprint, such as obtained or generated at substantially regular intervals. To illustrate, a proximate fingerprint may, for example, be obtained or generated approximately once every second, once every 50.0 milliseconds, once every minute, once an hour, once a day, or the like. Again, claimed subject matter is not so limited. Optionally or alternatively, a fingerprint may be obtained or generated on demand, such as, for example, via a request by a mobile device, reference device, location server, etc., just to illustrate another possible implementation.

In some instances, characteristics of signals obtained at or generated by environmental sensors of a mobile device may, for example, be compared with characteristics of signals currently or contemporaneously obtained at or generated by environmental sensors of a reference device. Based, at least in part, on a comparison, a determination may be made whether a mobile device is at or otherwise proximate or close to a known location of a reference device. For example, a proximity or closeness of a mobile device to a known location may be determined based, at least in part, on a degree of match of respective signal characteristics, just to illustrate one possible implementation. By comparing characteristics of signals obtained at or generated by a mobile device with respective characteristics obtained at or generated substantially contemporaneously by a reference device, for example, continual recreation or maintenance of voluminous or comprehensive heat map databases may be avoided or otherwise reduced. At times, accuracy of position estimation of a mobile device may, for example, be improved or enhanced via a deployment of a plurality of reference devices within an area of interest, as will be described in greater detail below. As will also be seen, in some implementations, a position of a mobile device may, for example, be estimated in connection with a suitable proximity measure, such as a proximity score determined with respect to each applicable sensor separately. A proximity score may, for example, be based, at least in part, on a probability of a mobile device being close or proximate to at least one location candidate and may be employed as a weighing factor to approximate or arrive at a predicted location of the mobile device.

Figure 1B:
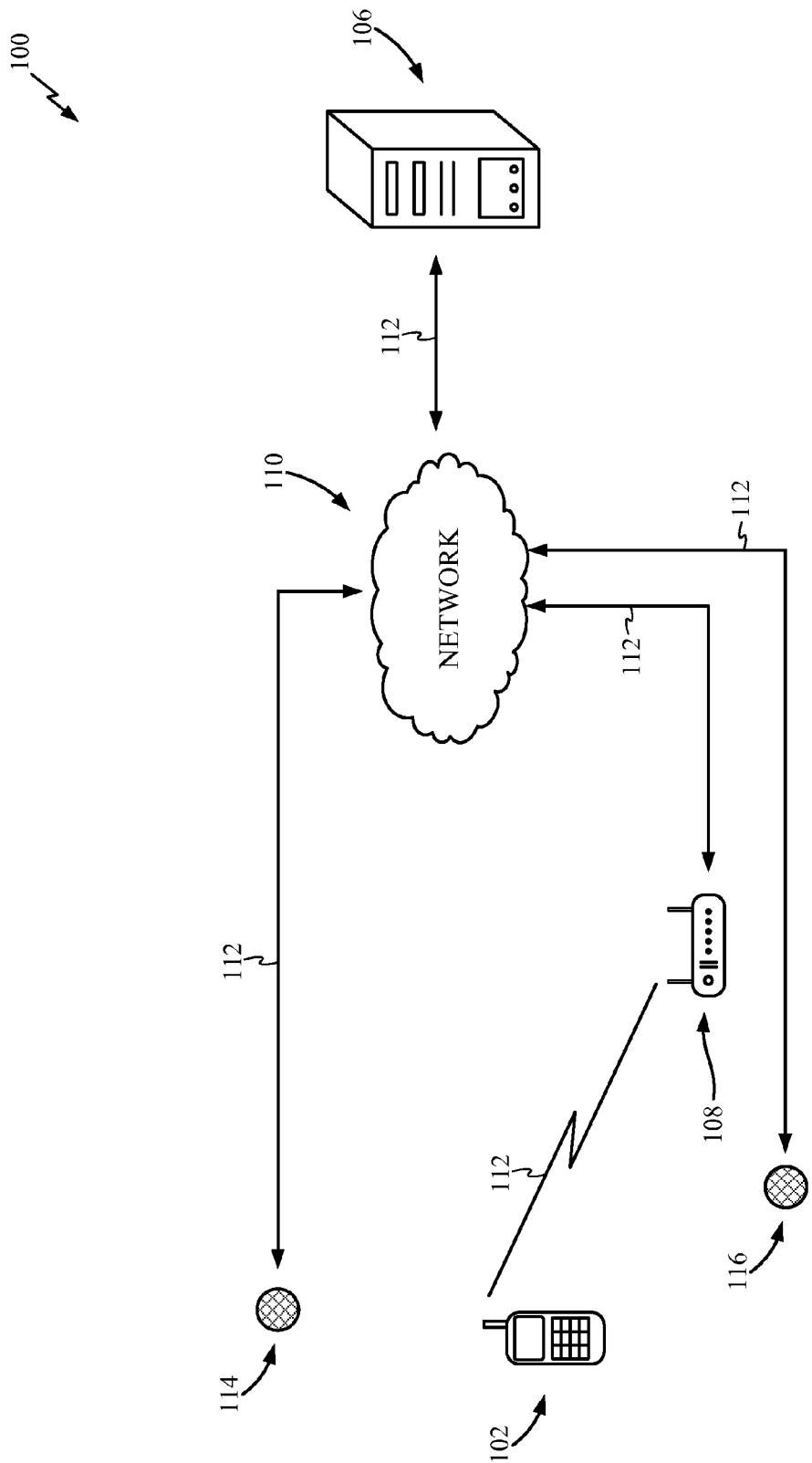
Figure 1C:
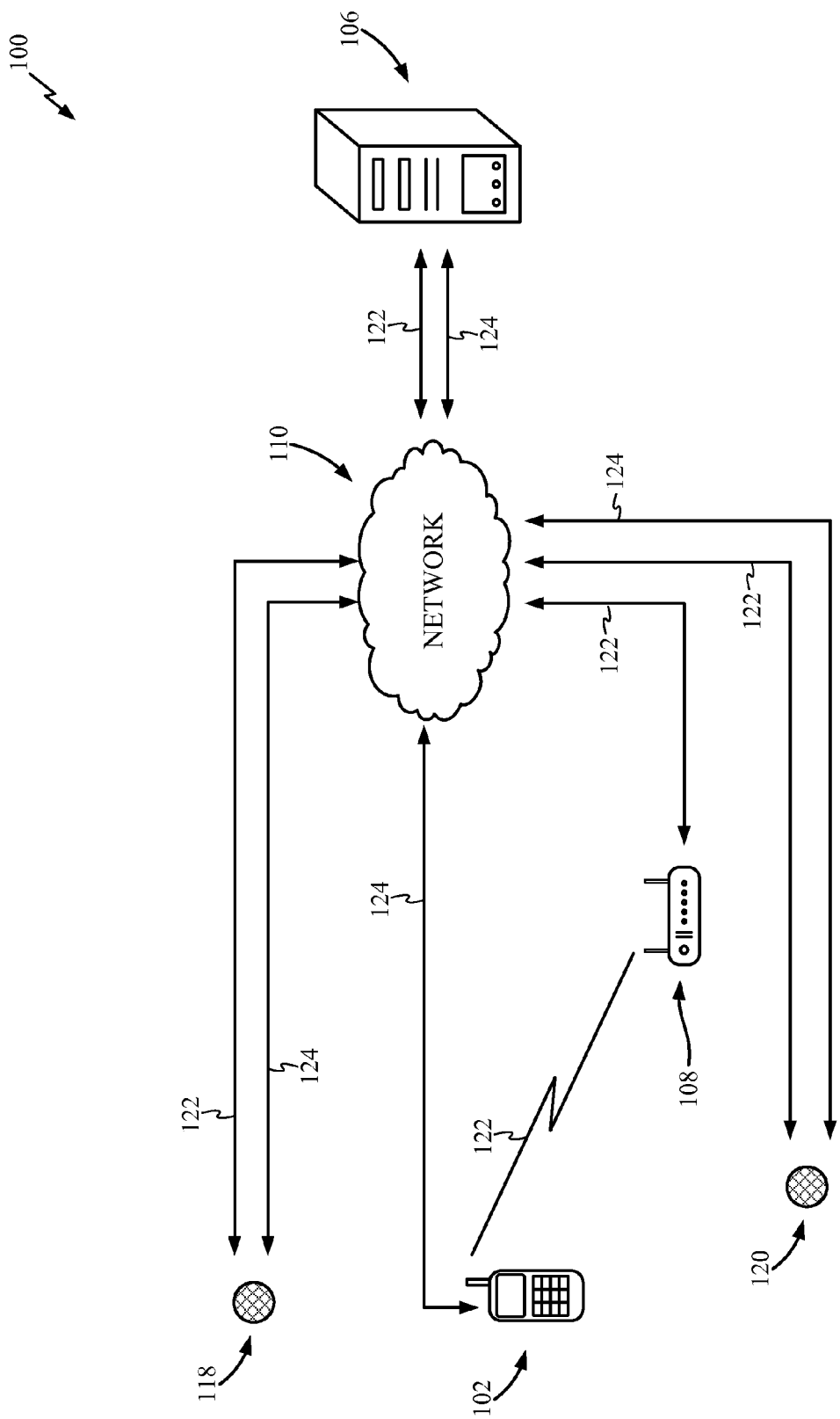

Attention is now drawn to FIGS. 1A-1C, which are schematic diagrams illustrating implementations of certain features associated with an example operating environment 100 capable of facilitating or supporting one or more processes or operations for position estimation of a mobile device 102, such as, for example, via one or more proximate fingerprints. It should be appreciated that operating environment 100 is described herein as a non-limiting example that may be implemented, in whole or in part, in the context of various communications networks or combination of networks. Such networks may include, for example, public networks (e.g., the Internet, the World Wide Web), private networks (e.g., intranets), wireless local area networks (WiFi LAN, etc.), or the like. In addition, to simplify discussion, features or aspects of operating environment 100 shown in FIG. 1A that correspond to like features or aspects illustrated in FIGS. 1B or 1C may be given corresponding reference numbers, where applicable.

As illustrated in FIG. 1A, operating environment 100 may comprise, for example, at least one reference device, indicated generally at 104, that may be fixedly deployed or positioned at a known location within any suitable indoor or like area of interest, such as a shopping mall, outlet store, sports arena, library, convention center, etc., just to name a few examples. It should be appreciated that claimed subject matter is not limited to indoor implementations. For example, in some instances, one or more operations or techniques described herein may be performed, in whole or in part, in an outdoor environment, partially or substantially enclosed areas associated with an indoor or outdoor environment (e.g., urban canyons, town squares, amphitheaters, parking garages, rooftop gardens, etc.), etc., or any combination thereof.

In some instances, operating environment 100 may comprise one or more wireless transmitters, such as an access point 108, for example, capable of facilitating or supporting communications between suitable computing platforms or devices, such as mobile device 102 and a server 106, just to illustrate one possible implementation. Wireless transmitters may be of the same or similar type, for example, or may represent different types of devices, such as access points, radio beacons, cellular base stations, femtocells, or the like, depending on an implementation. At times, one or more wireless transmitters may comprise, for example, wireless transceivers capable of transmitting as well as receiving wireless signals. As illustrated, here, access point 108 may, for example, be operatively coupled to a network 110, though claimed subject matter is not so limited. Network 110 may comprise, for example, the Internet or other computing or communication network capable of exchanging suitable information with mobile device 102, reference device 104, server 106, etc., such as via one or more communication links 112. Information may include, for example, suitable signal characteristics or fingerprints, assistance information (e.g., digital maps, etc.), cellular coverage or service information, or the like.

Even though a certain number of computing platforms or devices are illustrated herein, any number of suitable computing platforms or devices may be implemented to facilitate or otherwise support one or more techniques or processes associated with operating environment 100. Thus, it should be appreciated that configurations shown, such as in FIGS. 1A-1C, for example, are merely example configurations to which claimed subject matter is not limited. For example, in some implementations, mobile device 102 may be capable of communicating information of interest (e.g., signal characteristics, fingerprints, assistance information, etc.) with respect to a suitable device or platform (e.g., server 106, etc.) directly over an applicable cellular or like wireless communications network. As such, at times, network 110 may comprise or otherwise be coupled to a cellular or like wireless communications network (e.g., Wi-Fi, etc.), which may also enhance an applicable coverage area for communications with mobile device 102, reference device 104, server 106, or the like. In one particular implementation, network 110 may, for example, facilitate or support femtocell-based operative regions of coverage, just to illustrate another possible implementation. In addition, reference device 104 may be capable of transmitting wireless signals to and receiving such signals from one or more suitable computing platforms or devices associated with operating environment 100. For example, in some implementations, reference device 104 may be capable to communicate wirelessly with server 106, access point 108, mobile device 102, etc. or any combination thereof. Again, these are merely example implementations, and claimed subject matter is not limited in this regard. Thus, it should be noted that techniques described herein are not limited to communications over a network, but may in some embodiments include direct communication between mobile device 102 and reference device 104, for example, so as to transmit or exchange any suitable information, such as measurement signals, signal characteristics, or the like.

As previously mentioned, mobile device 102 and reference device 104, for example, may feature one or more environmental sensors capable of obtaining or generating suitable characteristics of signals within operating environment 100. For example, in operative use, characteristics of signals obtained at or generated by one or more sensors of reference device 104 may be forwarded or communicated to server 106 for comparisons with signals obtained at or generated substantially contemporaneously by sensors at mobile device 102. In some instances, signals may be time-referenced, for example, so as to enable correlation of suitable characteristics representative of current conditions at reference device 104 and mobile device 102. For example, signal characteristics may be time stamped, such as at reference device 104, mobile device 102, etc. before or while being communicated to sever 106. It should be noted that optionally or alternatively, server 106 may route suitable signals, such as encoded sensor signals, for example, from reference device 104 to mobile device 102 for position estimation at mobile device 102.

Continuing with the above discussion, characteristics of signals obtained or generated via mobile device 102 may, for example, be compared in some manner with characteristics of signals that were obtained or generated substantially contemporaneously via reference device 104. For example, in some instances, signal characteristics may be compared or matched in real time or near real time at server 106, though claimed subject matter is not so limited. At times, signal characteristics may, for example, be compared at mobile device 102, as previously mentioned. Thus, if characteristics of signals from mobile device 102 match or correlate with respective characteristics generated substantially contemporaneously from reference device 104, a position of mobile device 102 may, for example, be estimated to be at or close to a known location of reference device 104. In some instances, a closeness of mobile device 102 to a known location of reference device 104 may, for example, be determined based, at least in part, on a degree of match of respective signal characteristics. For example, in certain simulations or experiments, a distance of match in signal space may translate to a geographical distance between mobile device 102 and reference device 104, though claimed subject matter is not so limited. At times, a larger difference in match may, for example, translate to a stochastic location of mobile device 102, such as a predicted location (X, Y) with some probability (e.g., 50%, 65%, etc.) of it being a true location, as one possible example.

In some instances, reference device 104 may comprise, for example, a mobile reference device capable of obtaining or generating one or more fingerprints substantially contemporaneously with fingerprints from mobile device 102. For this example, a location of a mobile reference device may be tracked in a suitable manner, such as via a location server, for example, using any one of several positioning techniques known to those of ordinary skill in the art. For example, depending on an implementation, a location of a reference device, such as a substantially stationary or mobile reference device may be estimated via wireless signals acquired from a satellite positioning system (SPS), via Advanced Forward Link Trilateration (AFLT), base station identification, triangulation, heat map signature matching, in connection with Bluetooth™, ZigBee®, Near Field Communication (NFC), or like techniques or technologies. In addition, in some instances, a location of a mobile reference device may be tracked via crowdsourcing, such as based, at least in part, on known locations of one or more other devices, mobile or otherwise, known location of a reference device based on an area of deployment, or the like. In some embodiments, one or more locations of substantially stationary reference devices may be determined or recorded when deployed, for example. Again, positioning techniques are known and need not be described herein in greater detail.

Certain mobile communication devices may, for example, feature a location-aware or location-tracking capability to assist users in estimating their geographic locations by providing position information obtained or gathered from various systems. For example, a mobile communication device may obtain a location estimate or so-called "position fix" by acquiring wireless signals from a satellite positioning system (SPS), such as the global positioning system (GPS) or other like Global Navigation Satellite System (GNSS), cellular base station, location beacon, or the like via a cellular telephone or other wireless communications network. Received wireless signals may, for example, be processed by or at a mobile communication device, and its location may be estimated using appropriate techniques, such as, for example, Advanced Forward Link Trilateration (AFLT), base station identification, or the like.

Likewise, here, a mobile reference device may communicate a suitable fingerprint, such as a fingerprint generated substantially contemporaneously with a fingerprint from mobile device 102, for example, to server 106 for matching in real or near real time. Optionally or alternatively, signal characteristics of interest may be matched, for example, at a mobile device 102. A match or a certain degree of match may, for example, indicate that mobile device 102 is at or at least proximate to a known location of a mobile reference device, as discussed above. A degree of match may be determined, at least in part, experimentally and may be pre-defined or configured, for example, or otherwise dynamically defined in some manner, depending on a particular application, environment, sensor, or the like.

As further illustrated in FIG. 1B, operating environment 100 may comprise, for example, a plurality of reference devices, such as a reference device 114 and a reference device 116 that may be fixedly deployed at known locations. As was indicated, a deployment of multiple references devices may, for example, allow for improved or enhanced accuracy in a position estimate of mobile device 102. Reference devices 114 and 116 may comprise, for example, one or more environmental sensors capable of obtaining or generating suitable signal characteristics reflective of current conditions within operating environment 100, such as in a fashion similar to reference device 104 of FIG. 1A. For example, respective signal characteristics of reference devices 114 and 116 may be obtained or generated substantially contemporaneously with signal characteristics obtained at or generated by mobile device 102. Likewise, to estimate a location of mobile device 102, characteristics of signals from reference devices 114 and 116 may, for example, be matched or compared with respective characteristics of signals from mobile device 102, such as in real or near real time at server 106, just to illustrate one possible implementation.

For example, in some instances, a location of mobile device 102 may be estimated by determining degrees of correlation or match between signal characteristics from mobile device 102 and respective signal characteristics from reference devices 114 and 116. A higher degree of correlation may, for example, be indicative of a closer geographical relation (e.g., spatial distance, etc.) between a mobile device and a location of a particular reference device. By way of example but not limitation, in certain simulations of experiments, for example, the smaller the Euclidian distance between a reference device and a mobile device, the smaller the dissimilarity between respective signal characteristics. Again, claimed subject matter is not limited to this particular implementation, of course. To illustrate, in some instances, a reference device with smaller fingerprint dissimilarity, such as in comparison with a fingerprint from mobile device 102, for example, may be considered to be more proximate to mobile device 102. Any suitable approach may be utilized to approximate a location of mobile device 102, such as via proximate fingerprints obtained at or generated by two or more reference devices. For example, in some instances, a probabilistic approach, k-nearest-neighbor (kNN), neural networks, support vector machine (SVM), or the like may be employed, in whole or in part. In some instances, one or more reference devices may comprise a mobile reference device, for example, and may operate to facilitate or support like operations or functions as fixedly deployed reference devices 114 and 116, such as in a manner discussed above.

As noted below, reference devices, such as reference devices 114 and 116, may include similar types of sensors, such as RF antennas, for example, or may include different sensors. To illustrate, reference device 114 may include, for example, a temperature sensor, while reference device 116 may include a pressure sensor, just to illustrate one possible implementation. As another possible example, references devices 114 and 116 may include a microphone or other audio sensor instead of or in addition to one or more sensors listed above. Depending on an implementation, measurement signals from one or more sensors associated with one or more reference devices may be compared to a number of sensors featured on mobile device 102, such as utilizing one or more operations or techniques discussed herein.

Continuing now with FIG. 1C, which is a schematic diagram further illustrating certain features associated with example operating environment 100 where a position of mobile device 102 is estimated in connection with a proximity measure. As previously mentioned, in some instances, a proximity measure may comprise, for example, a proximity score that may be determined separately with respect to each of a plurality of sensors associated with a mobile device of interest, such as mobile device 102, just to illustrate one possible implementation. A proximity score may be based, at least in part, on a probability of a mobile device being close to a given location candidate, such as a known location of a reference device 118 and a reference device 120, for example, determined from the viewpoint of each applicable sensor. At times, a proximity score may, for example, be used, at least in part, as a weighing factor in connection with a suitable statistical likelihood model or function that may facilitate or support approximating or predicting a location of a mobile device, such as between two or more neighboring reference devices.

For example, each of a plurality of applicable devices associated with operating environment 100, such as mobile device 102, reference devices 118, 120, etc. may comprise a suite of environmental sensors capable of obtaining or generating suitable signal characteristics or fingerprinting measurements in a manner similar to like devices of FIG. 1B. In one particular implementation, each of a plurality of applicable devices may comprise, for example, an RF receiver and a microphone capable of obtaining or generating signal strength fingerprints and acoustic fingerprints, respectively, though claimed subject matter is not so limited. Signal strength and acoustic fingerprints of a plurality of applicable devices may be generated substantially contemporaneously, such as in a manner discussed above, for example, and may be communicated to server 106 for real time comparisons, as referenced generally via respective links 122 and 124. It should be noted that even though certain fingerprints are discussed herein, any suitable fingerprints, such as, for example, temperature fingerprints, ambient light fingerprints, ultrasonic fingerprints, or the like may be utilized, in whole or in part.

Following the above discussion, in an implementation, signal strength fingerprints and acoustic fingerprints obtained at or generated by applicable sensors of reference devices 118 and 120 may, for example, be matched with respective fingerprints obtained at or generated substantially contemporaneously by like sensors of mobile device 102. Upon or after matching, such as at server 106, for example, a proximity score descriptive of a probability of mobile device 102 being proximate to each neighboring device of interest (e.g., reference device 118, 120, etc.) may, for example, be determined with respect to each applicable sensor of mobile device 102, such as an RF receiver and a microphone. In some instances, a proximity score may be determined based, at least in part, on a degree of match of respective signal characteristics, such as of mobile device 102 and a particular reference device, as discussed above. For example, at times, a higher degree of match may be indicative of a closer geographical relation (e.g., via Euclidian distance, etc.) between mobile device 102 and a reference device of a known location, which may translate to a higher proximity score. Here, any suitable probabilistic approaches may be utilized.

If there is no or little proximity likelihood-related discrepancy or "disagreement" between different sensors of mobile device 102 with respect to a particular reference device, then that reference device may, for example, be considered to be more proximate to mobile device 102. As a way of illustration, RF sensor-related proximity scores of 0.68 and 0.75 determined with respect to neighboring reference devices 118 and 120, respectively, may, for example, indicate that mobile device 102 is probably closer to reference device 120 than to reference device 118. Likewise, microphone-related proximity scores of 0.77 and 0.92 may, for example, indicate that mobile device 102 is also probably closer to reference device 120 rather than to reference device 118. In other words, for this example, different sensors of mobile device 102, such as an RF receiver and a microphone "agree" or at least do not "disagree" that a more probable position of mobile device 102 may, for example, be estimated to be at or close to a known location of reference device 120.

In some instances, however, multi-sensor proximity scores may, for example, be descriptive of different location probabilities of mobile device 102 in relation to different neighboring reference devices, such as devices 118 and 120. For example, at times, RF sensor-related proximity scores may indicate that mobile device 102 is probably closer or more proximate to reference device 118 rather than reference device 120, but microphone-related proximity scores may indicate that mobile device 102 is closer to reference device 120 rather than 118. In one particular implementation, to resolve or account for such a discrepancy, proximity scores from different sensors may, for example, be adopted as weights that may be used, at least in part, as inputs in a suitable statistical likelihood model or function. By way of example but not limitation, a weighed kNN, neural networks, or other suitable probabilistic models or functions that may facilitate or support multi-sensor localization of mobile device 102 with respect to a plurality of neighboring reference devices may be utilized, in whole or in part.

In some implementations, a suitable weight matrix, such as a matrix of pairwise distances may, for example, be generated or otherwise considered to predict a location of mobile device 102. For example, a matrix may reconcile multi-sensor distances to produce a reasonable estimate of a location of mobile device 102 via a sensor-related confidence ranking with respect to a plurality of applicable reference devices (e.g., devices 118 and 120, etc.). At times, one or more Bayesian filtering processes or techniques, such as a particle filtering technique, for example, may be employed, at least in part, so as to integrate or otherwise account for a plurality of signal characteristics in a dynamic multi-sensor environment. In some embodiments, a proximity of mobile device 102 to reference devices 118 and 120 as well as other potential reference devices may be used, at least in part, to estimate a position of mobile device 102, such as using a trilateration process, for example. These techniques are generally known to those of ordinary skill in the art and need not be described in greater detail. Of course, claimed subject matter is not limited to one particular approach or technique.

It should be appreciated that, at times, an initial location of mobile device 102 may, for example, be approximated or estimated, for example by mobile device 102 or a server which mobile device 102 is in communication with, such as to narrow potential matches of signal characteristics with one or more reference devices 104, 114, 116, 118, 120, etc. positioned or located sufficiently nearby. At times, an initial location of mobile device 102 may be also approximated with respect or in relation to an applicable server associated with operating environment 100, such as server 106, for example, so as to perform one or more matching operations. For example, depending on an implementation, an initial location of mobile device 102 may be estimated based, at least in part, on a user input, recent position fix obtained via an SPS, in connection with an applicable location-based service (LBS), or the like. An initial estimate of a location of mobile device 102 may, for example, be obtained upon request (e.g., by mobile device 102, etc.), upon or after entering an indoor or like area of interest associated with operating environment 100, such as pre-fetched or pre-loaded to mobile device 102 (e.g., in cache, memory, etc.) via any suitable push or pull technology.

In some instances, server 106 may comprise, for example, a local server, such as a server located behind a WiFi LAN associated with operating environment 100, or, optionally or alternatively, a global or back-end server associated with a suitable service provider and having access to network 110. For example, when server 106 is located behind a WiFi LAN over which mobile device 102 is communicating, server 106 may compare signals from references devices in communication with the LAN to signals from mobile device 102 so as to determine a proximity of mobile device 102, or server 106 may forward signals from these reference devices to mobile device 102 so as to determine a proximity of mobile device 102. In one implementation, the WiFi LAN may provide service to a shopping mall or indoor environment, for example, and signals from mobile device 102 are compared to contemporaneous signals of at least a subset of reference devices in such a mall or indoor environment. As another example, when server 106 is a global server, potential reference devices to which mobile device 102 may be compared may, for example, be narrowed based, at least in part, on an approximate position of mobile device 102, or a database of potential reference devices may be maintained based, at least in part, on a gateway through which communications are received from mobile device 102, such as based, at least in part, on a profile of mobile device 102, etc. In at least one implementation, one or more matching operations may, for example, be limited to one or more reference devices "visible" to one or more wireless transmitters associated with operating environment 100, such as access point 108, suitable gateway, or the like. Thus, signals or characteristics thereof from relevant or nearby reference devices, or a set of reference devices having signals to which signals from mobile device 102 are compared, may be determined, compared, or forwarded, for example, for real time determination of a position or proximity of mobile device 102. Of course, claimed subject matter is not limited to these particular implementations.

Figure 2:
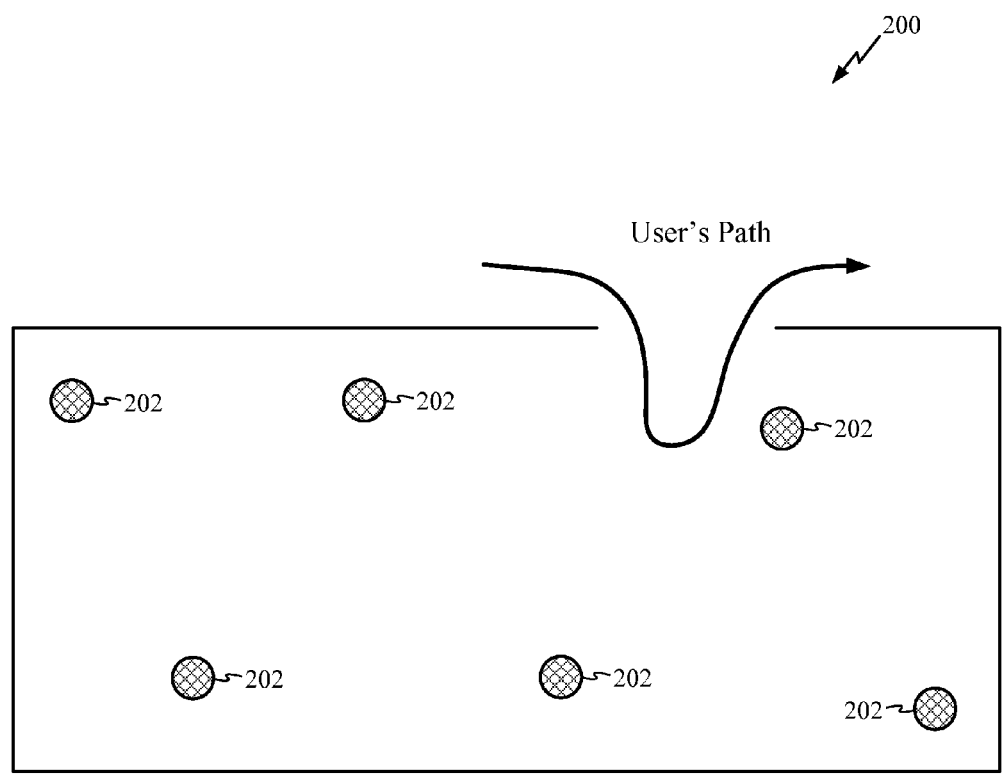
FIG. 2 is a schematic diagram illustrating an implementation of certain features associated with an example check-in environment.

As previously mentioned, in some implementations, proximate fingerprints of suitable reference devices, such as devices fixedly deployed at known locations, for example, may be used, at least in part, in connection with an automated "check-in" or "check-out" service, such as for a user associated with a mobile device of interest. A service may, for example, be implemented within a suitable operating environment, such as a relatively dynamic signal environment associated with a sales floor of a retail establishment, check-in kiosk of a hotel, airport, etc., check-out stand of a supermarket, in connection with social networking applications, or the like. FIG. 2 is a schematic diagram illustrating certain features of an implementation of an example check-in environment 200 capable of facilitating or supporting one or more processes or operations for position estimation of a mobile device via one or more proximate fingerprints. As illustrated, one or more reference devices 202 may, for example, be strategically positioned at known locations within example check-in environment 200, such as near a store entrance, at a check-out stand, various store sections, or the like. Likewise, here, one or more signal fingerprints of reference devices 202 may, for example, be obtained or generated substantially contemporaneously with respective fingerprints of a mobile device of interest and may be subsequently communicated to a suitable server, such as for real time matching, as mentioned above. As also discussed, signal fingerprints of reference devices 202 may, for example, be generated periodically, at substantially regular time intervals or periods, on demand, such as via a request by a mobile device, location server, or the like.

In operative use, if a user approaches a suitable reference device, such as a reference device positioned near a store entrance or user's path, for example, dissimilarity between fingerprints of a mobile device and the reference device may be small enough to declare that the mobile device is at or proximate to a location of the reference device, thus, triggering a "check-in" of a user. Respective signal characteristics or fingerprints of applicable mobile and reference devices may, for example, be generated or matched using one or more operations or techniques discussed above. One or more suitable reference devices, such as devices strategically positioned throughout example check-in environment 200 may, for example, be used, at least in part, to determine the time that a user (e.g., a customer, etc.) dwells on any particular portion of the store, sections entered, track movement of a mobile device, or the like. Thus, embodiments discussed herein may be used, in whole or in part, to model movement of a mobile device and associated user through a store or other location that may be associated with environment 200.

In some instances, a user may be "checked-out" if, for example, dissimilarity between respective fingerprints obtained at or generated by an associated mobile device and all or most of applicable reference devices within check-in environment 200 is sufficiently large, or if the user is determined to be sufficiently close to another reference device, for example. It should be noted that in some implementations one or more reference devices 202 associated with example check-in environment 200 may comprise, for example, mobile reference devices that may operate to facilitate or support like operations or functions as fixedly deployed reference devices, such as in a manner discussed above. Again, example environment 200 may provide benefits. For example, users may perform check-ins in connection with social networking, confirm identities as social reviewers, or the like. In turn, stores may track users' purchasing behavior, determine effectiveness of store displays, interest in products, offer deals or promotions, electronically deliver sales coupons, advertisements, etc., for example, based, at least in part, on a user's determined location, movement through environment 200, or the like. Of course, these are merely details relating to benefits of example environment 200, and claimed subject matter is not so limited.

Figure 3:
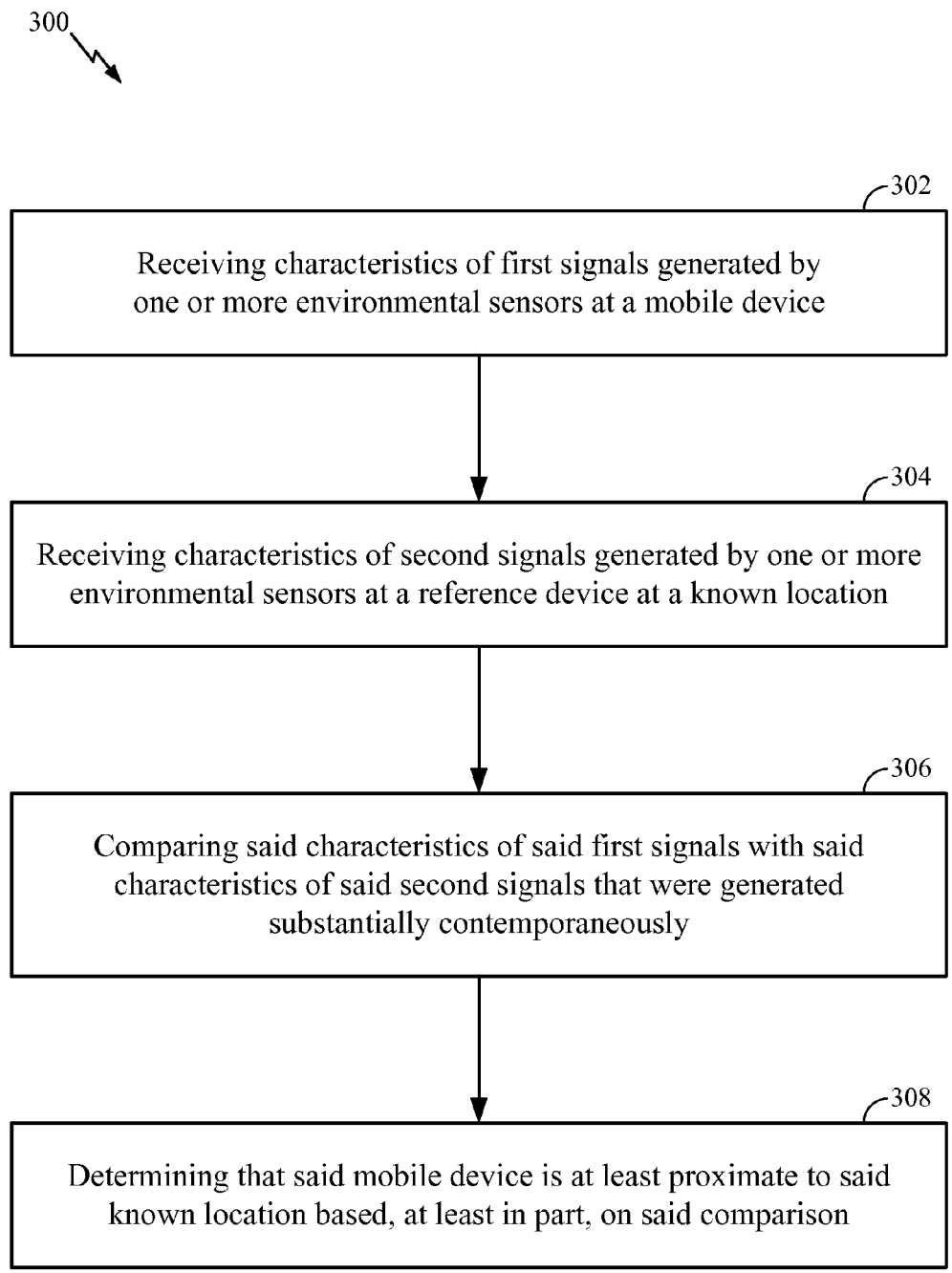
FIG. 3 is a flow diagram illustrating an implementation of an example process for position estimation via proximate fingerprints.

Attention is now drawn to FIG. 3, which is a flow diagram illustrating an implementation of an example process 300 that may be implemented, in whole or in part, to facilitate or support one or more operations or techniques for position estimation via one or more proximate fingerprints for use in or with a mobile device. It should be appreciated that even though one or more operations are illustrated or described concurrently or with respect to a certain sequence, other sequences or concurrent operations may also be employed. In addition, although the description below references particular aspects or features illustrated in certain other figures, one or more operations may be performed with other aspects or features.

Example process 300 may, for example, begin at operation 302 with receiving characteristics of first signals generated by one or more environmental sensors at a mobile device. As previously mentioned, characteristics of signals may comprise, for example, one or more signatures or fingerprints of wireless or like signals, such as received signal strength (e.g., RSSI, etc.), round-trip delay times (e.g., RTT, etc.), though claimed subject matter is not so limited. For example, at times, signal characteristics may comprise an acoustic fingerprint, temperature fingerprint, ambient light fingerprint, or the like. Characteristics of first signals may be received at a suitable computing platform or device, such as, for example, a location server, mobile device, or the like, as was also indicated.

At operation 304, characteristics of second signals generated by one or more environmental sensors at a reference device at a known location may, for example, be received. Likewise, here, characteristics of second signals may comprise, for example, a signal strength fingerprint, acoustic fingerprint, temperature fingerprint, ambient light fingerprint, or the like. In some instances, characteristics of second signals may, for example, be generated or obtained substantially contemporaneously with characteristics of first signals, such as characteristics generated by one or more environmental sensors at a mobile device. Similarly, here, characteristics of second signals may be received at a suitable computing platform or device, such as, for example, a location server, mobile device, or the like.

With regard to operation 306, characteristics of first signals may, for example, be compared or matched with characteristics of second signals that were generated substantially contemporaneously. For example, in some instances, respective signal characteristics may be compared or matched in real time or near real time at a suitable server, such as a location server, though claimed subject matter is not so limited. At times, signal characteristics may, for example, be compared at a mobile device, as discussed above. At operation 308, a determination may, for example, be made whether a mobile device of interest is at least proximate to a known location of a reference device based, at least in part, on such a comparison. For example, if characteristics of signals from a mobile device match or correlate with respective characteristics from a reference device, a position of the mobile device may, for example, be estimated to be at or close to a known location of the reference device. In some instances, a closeness of a mobile device to a known location of a reference device may, for example, be determined based, at least in part, on a degree of match of respective signal characteristics, as was also indicated.

Figure 4:
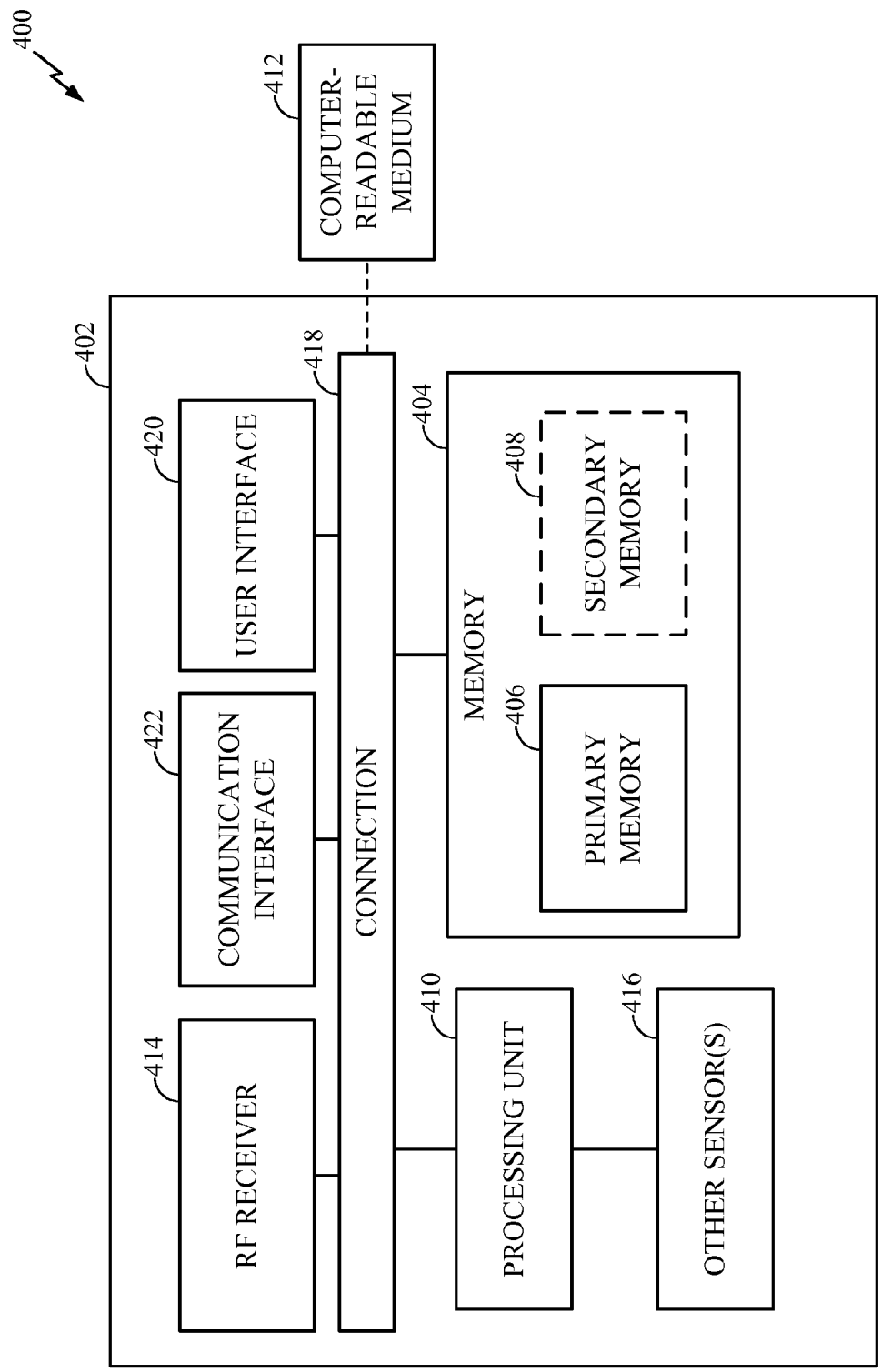
FIG. 4 is a schematic diagram illustrating an implementation of an example computing environment associated with a mobile device.

FIG. 4 is a schematic diagram illustrating an implementation of an example computing environment 400 that may include one or more mobile devices capable of partially or substantially implementing or supporting one or more operations or processes for position estimation via one or more proximate fingerprints. It should be appreciated that all or part of various devices shown in computing environment 400, processes, or methods, as described herein, may be implemented using various hardware, firmware, or any combination thereof along with software.

Computing environment 400 may include, for example, a mobile device 402, which may be capable of communicating with one or more other devices, mobile or otherwise, via a cellular telephone network, the Internet, mobile ad-hoc network, wireless sensor network, or the like. Mobile device 402 may comprise, for example, one or more mobile devices or reference devices discussed above with respect to various example implementations of FIGS. 1A-2. For example, depending on an implementation, mobile device 402 may take the form of any of mobile device 102, reference devices 104, 114, 116, 118, or 120, or any combination thereof. In an implementation, mobile device 402 may be representative of any electronic or computing device, machine, appliance, or platform that may be capable of exchanging information over any suitable network. For example, mobile device 402 may include one or more computing devices or platforms associated with, for example, cellular telephones, satellite telephones, smart telephones, personal digital assistants (PDAs), laptop computers, personal entertainment systems, e-book readers, tablet personal computers (PC), personal audio or video devices, personal navigation devices, or the like. In certain example implementations, mobile device 402 may take the form of one or more integrated circuits, circuit boards, or the like that may be operatively enabled for use in another device. Thus, unless stated otherwise, to simplify discussion, various functionalities, elements, components, etc. are described below with reference to mobile device 402 may also be applicable to other devices not shown so as to support one or more processes associated with example computing environment 400.

Although not shown, optionally or alternatively, there may be additional devices, mobile or otherwise, communicatively coupled to mobile device 402 to facilitate or otherwise support one or more processes associated with computing environment 400, as discussed above. For example, computing environment 400 may include various computing or communication resources capable of obtaining position or location information with regard to mobile device 402 based, at least in part, on one or more wireless signals associated with a positioning system, location-based service, or the like. In certain example implementations, computing environment 400 may include, for example, one or more devices capable of acquiring or obtaining all or part of position or location information with respect to mobile device 402. Location information may, for example, be stored in some manner in memory 404 along with other suitable or desired information, such as one or more characteristics of signals, proximity scores, fingerprint-related time intervals, or the like.

Memory 404 may represent any suitable or desired information storage medium. For example, memory 404 may include a primary memory 406 and a secondary memory 408. Primary memory 406 may include, for example, a random access memory, read only memory, etc. While illustrated in this example as being separate from a processing unit 410, it should be appreciated that all or part of primary memory 406 may be provided within or otherwise co-located/coupled with processing unit 410. Secondary memory 408 may include, for example, the same or similar type of memory as primary memory or one or more information storage devices or systems, such as, for example, a disk drive, an optical disc drive, a tape drive, a solid state memory drive, etc. In certain implementations, secondary memory 408 may be operatively receptive of, or otherwise enabled to be coupled to, a computer-readable medium 412. Memory 404, 406, or 408 may be configured similar to computer-readable medium 412 or comprise a computer-readable medium as described below in some embodiments.

Computer-readable medium 412 may include, for example, any medium that may store or provide access to information, code or instructions (e.g., an article of manufacture, etc.) for one or more devices associated with computing environment 400. For example, computer-readable medium 412 may be provided or accessed by processing unit 410. As such, in certain example implementations, the methods or apparatuses may take the form, in whole or part, of a computer-readable medium that may include computer-implementable instructions stored thereon, which may be executed by at least one processing unit or other like circuitry so as to enable processing unit 410 or the other like circuitry to perform all or portions of a location determination processes, sensor-based or sensor-supported measurements (e.g., acceleration, orientation, tilt, rotation, sound or luminous intensity, signal strength, etc.), comparisons of suitable signal characteristics, or any processes to facilitate or support one or more operations or techniques for position estimation via proximate fingerprints. In certain example implementations, processing unit 410 may be capable of performing or supporting other functions, such as communications, navigations, video or like gaming, or the like.

It should be understood that a storage medium, such as memory 404, computer-readable medium 412, etc. may typically, although not necessarily, be non-transitory or may comprise a non-transitory device. In this context, a non-transitory storage medium may include, for example, a device that is physical or tangible, meaning that the device has a concrete physical form, although the device may change state. For example, one or more electrical binary digital signals representative of information, in whole or in part, in the form of zeros may change a state to represent information, in whole or in part, as binary digital electrical signals in the form of ones, to illustrate one possible implementation. As such, "non-transitory" may refer, for example, to any medium or device remaining tangible despite this change in state.

Processing unit 410 may be implemented in hardware or a combination of hardware and software. Processing unit 410 may be representative of one or more circuits capable of performing at least a portion of information computing technique or process. By way of example but not limitation, processing unit 410 may include one or more processors, controllers, microprocessors, microcontrollers, application specific integrated circuits, digital signal processors, programmable logic devices, field programmable gate arrays, or the like, or any combination thereof. Thus, at times, processing unit 410 may comprise, for example, or be representative of comparison means as well as determination means, as discussed above with respect to various example implementations. As previously mentioned, comparison means may, for example, be utilized, at least in part, for comparing characteristics of signals obtained from one or more mobile devices, reference devices, or the like, or any combination thereof, for example, as illustrated in or described with respect to operation 306 of FIG. 3. Determination means may, for example, be used, at least in part, for determining that a mobile device is at least proximate to a known location of a reference device based, at least in part, on a comparison of suitable signal characteristics, degree of match, proximity score, etc., for example, as illustrated in or described with respect to operation 308 of FIG. 3. Depending on an implementation, determination means may also be employed, at least in part, for determining time that a mobile device has spent in a suitable area (e.g., a retail store, etc.), for determining an approximate position of a mobile device, or the like. In some instances, processing unit 410 may be representative of or comprise, for example, proximity means for determining an approximate location of a mobile device based, at least in part, on a comparison of measurements from the mobile device with measurements from at least one of a plurality of reference devices, as was also indicated. In addition, in at least one implementation, processing unit 410 may be representative of or comprise, for example, tracking means for tracking movement of a mobile device and associated user within an area of interest.

Mobile device 402 may include various components or circuitry, such as, for example, one or more environmental sensors, as discussed above. For example, mobile device 402 may comprise an RF receiver 414 or various other sensor(s) 416, such as a magnetometer, ambient light detector, camera imager, microphone, temperature sensor, atmospheric pressure sensor, etc. to facilitate or otherwise support one or more processes associated with computing environment 400. In some instances, RF receiver 414 may comprise, for example, or be representative of receiving means for receiving characteristics of applicable signals, signal measurements, etc., as discussed above. In some embodiments, RF receiver 414 or receiving means may be used, at least in part, to implement operation 304 of FIG. 3. In some embodiments, a polling interface or other interface to one or more sensors may comprise receiving means or be representative of receiving means, for example, for receiving or obtaining characteristics of applicable signals, signal measurements, etc. from sensors 416. In some embodiments, these receiving means may be used, at least in part, to implement operation 302 of FIG. 3. Sensors 416 may, for example, comprise or be representative of means for generating or sensing environmental attributes with respect to one or more mobile devices, reference devices, or the like. Sensors 416 may, for example, provide analog or digital signals representing characteristics of suitable signals, signal measurements, etc. to processing unit 410. Although not shown, it should be noted that mobile device 402 may include an analog-to-digital converter (ADC) for digitizing analog signals from one or more sensors. Optionally or alternatively, such sensors may include a designated (e.g., an internal, etc.) ADC(s) to digitize signals, although claimed subject matter is not so limited.

Although not shown, mobile device 402 may also include a memory or information buffer to collect suitable or desired information, such as, for example, fingerprinting measurements or signal characteristics, and a power source to provide power to some or all of the components or circuitry. A power source may be a portable power source, such as a battery, for example, or may comprise a fixed power source, such as an outlet (e.g. in a house, electric charging station, car, etc.). It should be appreciated that a power source may be integrated into (e.g., built-in, etc.) or otherwise supported by (e.g., stand-alone, etc.) mobile device 402.

Mobile device 402 may include one or more connections 418 (e.g., buses, lines, conductors, optic fibers, etc.) to operatively couple various circuits together, and a user interface 420 (e.g., display, touch screen, keypad, buttons, knobs, microphone, speaker, trackball, information port, etc.) to receive user input, facilitate or support sensor-related measurements, or provide information to a user. Mobile device 402 may further include a communication interface 422 (e.g., wireless transmitter or receiver, modem, antenna, etc.) to allow for communication with one or more other devices or systems over one or more suitable communications networks, as was indicated. For example, according to one or more implementations, communication interface 422 may comprise or be representative of transmitting means that may be used, at least in part, for transmitting a request to a reference device in response to receiving characteristics of signals from a mobile device, reference device, or any combination thereof. At times, communication interface 422 may comprise or be representative of transmitting means for transmitting a request to a reference device in response to receiving a request from a mobile device, for example.

Figure 5:
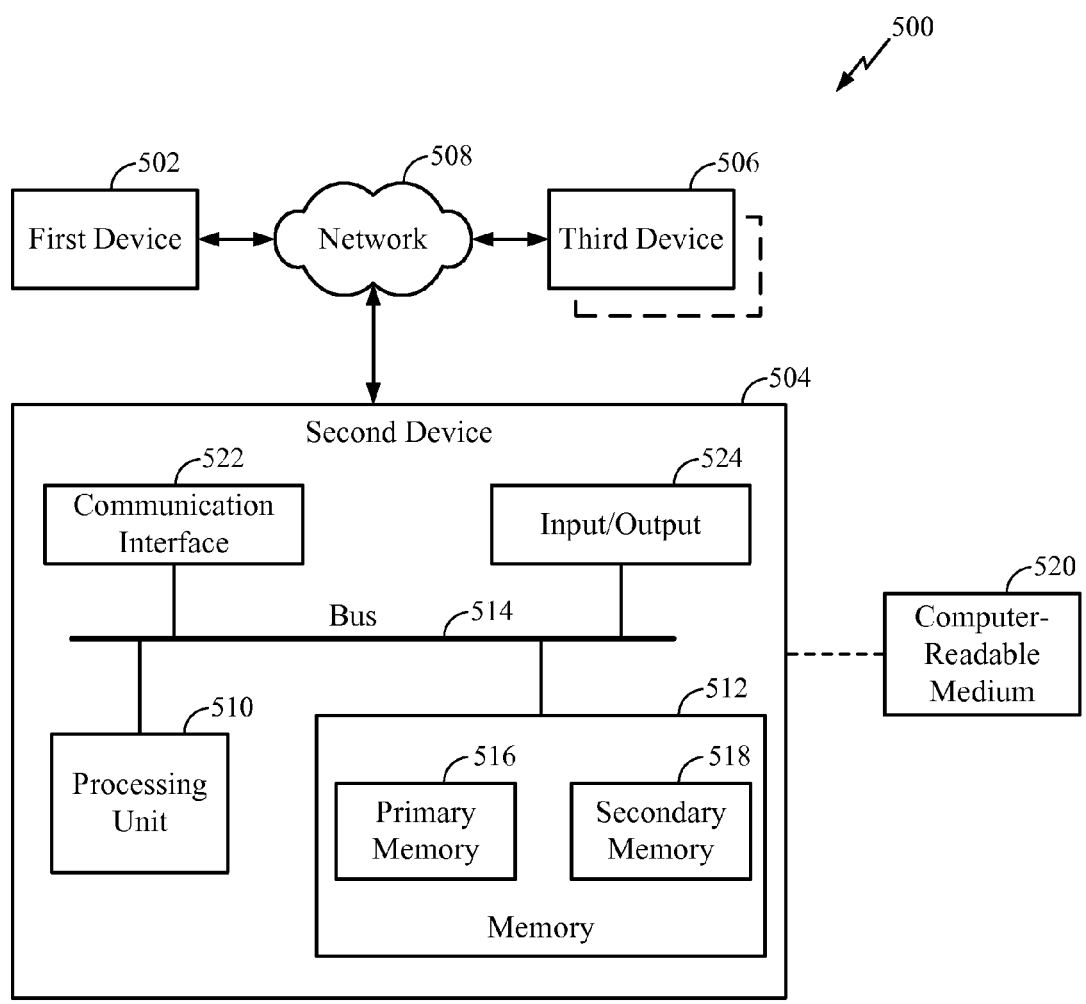
FIG. 5 is a schematic diagram illustrating an implementation of an example computing environment associated with a server.

FIG. 5 is a schematic diagram illustrating an implementation of an example computing environment 500 that may include one or more servers or other devices capable of partially or substantially implementing or supporting one or more operations or processes for position estimation via one or more proximate fingerprints. Computing environment 500 may include, for example, a first device 502, a second device 504, a third device 506, etc., which may be operatively coupled together via a communications network 508.

First device 502, second device 504 and third device 506 may be representative of any device, appliance, platform, or machine that may be capable of exchanging information over communications network 508. By way of example but not limitation, any of first device 502, second device 504, or third device 506 may include: one or more computing devices or platforms, such as, for example, a desktop computer, a laptop computer, a workstation, a server device, or the like; one or more personal computing or communication devices or appliances, such as, for example, a personal digital assistant, mobile communication device, or the like; a computing system or associated service provider capability, such as, for example, a database or information storage service provider/system, a network service provider/system, an Internet or intranet service provider/system, a portal or search engine service provider/system, a wireless communication service provider/system; or any combination thereof. Any of first, second, or third devices 502, 504, and 506, respectively, may comprise one or more of a mobile device, reference device, fixed or mobile, wireless transmitter or receiver, etc. in accordance with example implementations described herein.

In an implementation, network 508 may be representative of one or more communication links, processes, or resources configurable to support an exchange of information between at least two of first device 502, second device 504, and third device 506. By way of example but not limitation, network 508 may include wireless or wired communication links, telephone or telecommunications systems, information buses or channels, optical fibers, terrestrial or space vehicle resources, local area networks, wide area networks, intranets, the Internet, routers or switches, and the like, or any combination thereof. As illustrated, for example, via a dashed lined box partially obscured by third device 506, there may be additional like devices operatively coupled to network 508. It is also recognized that all or part of various devices or networks shown in computing environment 500, or processes or methods, as described herein, may be implemented using or otherwise including hardware, firmware, software, or any combination thereof.

By way of example but not limitation, second device 504 may include at least one processing unit 510 that may be operatively coupled to a memory 512 via a bus 514. Processing unit 510 may be representative of one or more circuits capable of performing at least a portion of a suitable computing procedure or process. For example, processing unit 510 may include one or more processors, controllers, microprocessors, microcontrollers, application specific integrated circuits, digital signal processors, programmable logic devices, field programmable gate arrays, or the like, or any combination thereof. As was indicated, in some embodiments, second device 504 may comprise an implementation of server 106 of FIG. 1, for example.

In certain server-based or server-supported implementations, processing unit 510 may comprise, for example, or be representative of comparison means for comparing characteristics of various signals of interest, such as signals from various devices that were generated substantially contemporaneously, as well as determination means for determining proximity of a mobile device to a known location of a reference device based, at least in part, on such comparison, for example, as illustrated in or described with respect to operation 306 or 308 of FIG. 3. In at least one implementation, processing unit 510 may comprise, for example, or be representative of determination means for determining a degree of match of received signal characteristics, for determining a proximity of a mobile device to at least one known location associated with at least one reference device, for determining a time a mobile device has spent in an area of interest, proximity score, etc., as discussed above. At times, processing unit 510 may comprise or be representative of tracking means for tracking movement of a mobile device within an area of interest, for example, as well as proximity means for determining an approximate location of such a mobile device.

Memory 512 may be representative of any information storage mechanism. Memory 512 may include, for example, a primary memory 516 and a secondary memory 518. Primary memory 516 may include, for example, a random access memory, read only memory, etc. While illustrated in this example as being separate from processing unit 510, it should be understood that all or part of primary memory 516 may be provided within or otherwise co-located/coupled with processing unit 510.

Secondary memory 518 may include, for example, same or similar type of memory as primary memory or one or more information storage devices or systems, such as, for example, a disk drive, an optical disc drive, a tape drive, a solid state memory drive, etc. In certain implementations, secondary memory 518 may be operatively receptive of, or otherwise configurable to couple to, a computer-readable medium 520. Computer-readable medium 520 may include, for example, any non-transitory medium that may carry or make accessible information, code, or instructions for one or more of devices in computing environment 500. Computer-readable medium 520 may also be referred to as a storage medium.

Second device 504 may include, for example, a communication interface 522 that may provide for or otherwise support an operative coupling of second device 504 to at least network 508. By way of example but not limitation, communication interface 522 may include a network interface device or card, a modem, a router, a switch, a transceiver, and the like. Thus, according to an implementation, communication interface 522 may comprise or be representative of transmitting means for transmitting a request to a reference device in response to receiving signal characteristics, for example, or in response to receiving a request from a mobile device. In certain example implementations, communication interface 522 may, for example, comprise or be representative of receiving means for receiving characteristics of signals of interest generated by one or more means for sensing environmental attributes (e.g., environmental sensors, etc.) at a mobile device, reference device, or any combination thereof, for example, as illustrated in or described with respect to operation 302 or 304 of FIG. 3.

Second device 504 may also include, for example, an input/output device 524. Input/output device 524 may be representative of one or more devices or features that may be configurable to accept or otherwise introduce human or machine inputs, or one or more devices or features that may be configurable to deliver or otherwise provide for human or machine outputs. By way of example but not limitation, input/output device 524 may include an operatively configured display, speaker, keyboard, mouse, trackball, touch screen, information port, or the like.

Methodologies described herein may be implemented by various means depending upon applications according to particular features or examples. For example, such methodologies may be implemented in hardware, firmware, software, discrete/fixed logic circuitry, any combination thereof, and so forth. In a hardware or logic circuitry implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices or units designed to perform the functions described herein, or combinations thereof, just to name a few examples.

For a firmware or software implementation, the methodologies may be implemented with modules (e.g., procedures, functions, etc.) having instructions that perform functions described herein. Any machine readable medium tangibly embodying instructions may be used in implementing methodologies described herein. For example, software codes may be stored in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored. In at least some implementations, one or more portions of the herein described storage media may store signals representative of information as expressed by a particular state of the storage media. For example, an electronic signal representative of information may be "stored" in a portion of the storage media (e.g., memory) by affecting or changing the state of such portions of the storage media to represent information as binary information (e.g., via ones and zeros). As such, in a particular implementation, such a change of state of the portion of the storage media to store a signal representative of information constitutes a transformation of storage media to a different state or thing.

As was indicated, in one or more example implementations, the functions described may be implemented in hardware, software, firmware, discrete/fixed logic circuitry, some combination thereof, and so forth. If implemented in software, the functions may be stored on a physical computer-readable medium as one or more instructions or code. Computer-readable media include physical computer storage media. A storage medium may be any available physical medium that may be accessed by a computer. By way of example, and not limitation, such computer-readable media may comprise RAM, ROM, EEPROM, CD-ROM or other optical disc storage, magnetic disk storage or other magnetic storage devices, or any other medium that may be used to store desired program code in the form of instructions or information structures and that may be accessed by a computer or processor thereof. Disk and disc, as used herein, includes compact disc (CD), laser disc, optical disc, digital versatile disc (DVD), floppy disk and blue-ray disc where disks usually reproduce information magnetically, while discs reproduce information optically with lasers.

As discussed above, a mobile device may be capable of communicating with one or more other devices via wireless transmission or receipt of information over various communications networks using one or more wireless communication techniques. Here, for example, wireless communication techniques may be implemented using a wireless wide area network (WWAN), a wireless local area network (WLAN), a wireless personal area network (WPAN), or the like. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rdGeneration Partnership Project" (3GPP). Cdma2000 is described in documents from a consortium named "3rd Generation Partnership Project 2 "(3GPP2). 3GPP and 3GPP2 documents are publicly available. A WLAN may include an IEEE 802.11x network, and a WPAN may include a Bluetooth network, an IEEE 802.15x or some other type of network, for example. The techniques may also be implemented in conjunction with any combination of WWAN, WLAN, or WPAN. Wireless communication networks may include so-called next generation technologies (e.g., "4G"), such as, for example, Long Term Evolution (LTE), Advanced LTE, WiMAX, Ultra Mobile Broadband (UMB), or the like.

In an implementation, a mobile device may, for example, be capable of communicating with one or more femtocells, such as for the purpose of estimating its location, communicating with a suitable server, or the like. As used herein, "femtocell" may refer to one or more smaller-size cellular base stations that may be capable of detecting a wireless signal transmitted from a mobile device using one or more appropriate techniques. Typically, although not necessarily, a femtocell may utilize or otherwise be compatible with various types of communication technology such as, for example, Universal Mobile Telecommunications System (UTMS), Long Term Evolution (LTE), Evolution-Data Optimized or Evolution-Data only (EV-DO), GSM, Worldwide Interoperability for Microwave Access (WiMAX), Code division multiple access (CDMA)-2000, or Time Division Synchronous Code Division Multiple Access (TD-SCDMA), to name just a few examples among many possible. In certain implementations, a femtocell may comprise integrated WiFi, for example. However, such details relating to femtocells are merely examples, and claimed subject matter is not so limited.

Also, if applicable, computer-readable code or instructions may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, and microwave. Combinations of the above may also be included within the scope of physical transmission media. Such computer instructions may be transmitted in portions (e.g., first and second portions) at different times (e.g., at first and second times). Some portions of this Detailed Description are presented in terms of algorithms or symbolic representations of operations on binary digital signals stored within a memory of a specific apparatus or special purpose computing device or platform. In the context of this particular Specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

While certain example techniques have been described and shown herein using various methods or systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to particular examples disclosed, but that such claimed subject matter may also include all implementations falling within the scope of the appended claims, and equivalents thereof.

What is claimed is:

1. A method comprising:
   receiving characteristics of first signals generated by one or more environmental sensors at a mobile device positioned at an initial location, said characteristics of said first signals being measured via said mobile device;
   receiving characteristics of second signals generated by one or more environmental sensors at a reference device at a known location, said characteristics of said second signals being measured via said reference device;
   comparing said characteristics of said first signals with said characteristics of said second signals that were generated substantially contemporaneously to determine potential matches of said first signals with said second signals; and
   narrowing said potential matches of said first signals with said second signals to determine that said mobile device is at least proximate to said known location based, at least in part, on said comparison and said initial location of said mobile device.

2. The method of claim 1, wherein said reference device comprises a mobile reference device at said known location.

3. The method of claim 1, wherein said reference device is fixedly deployed at said known location.

4. The method of claim 1, wherein said one or more environmental sensors at said mobile device or at said reference device comprises at least one of the following: a radio frequency (RF) receiver; a magnetometer; an ambient light detector; a camera imager; a microphone; a temperature sensor; an atmospheric pressure sensor; or any combination thereof.

5. The method of claim 1, and further comprising:
   determining a degree of match of said first signals with said second signals; and
   determining a proximity of said mobile device to said known location based, at least in part, on said degree of match.

6. The method of claim 1, and further comprising:
   determining a time said mobile device has spent in an area proximate to said known location based, at least in part, on said comparison.

7. The method of claim 1, and further comprising tracking movement of said mobile device based, at least in part, on said comparison.

8. The method of claim 1, wherein said characteristics of said first and said second signals comprises a fingerprint of a wireless environment.

9. The method of claim 8, wherein said fingerprint comprises a time-varying fingerprint.

10. The method of claim 9, wherein said time-varying fingerprint comprises a fingerprint obtained within a relatively dynamic signal environment.

11. The method of claim 1, and further comprising transmitting a request to said reference device in response to said receiving said characteristics of said first signals or in response to receiving a request from said mobile device, wherein said characteristics of said second signals are received in response to said transmitted request.

12. The method of claim 1, wherein said characteristics of said second signals were generated within a minute of said characteristics of said first signals being generated.

13. The method of claim 1, and further comprising:
   receiving characteristics of additional signals generated by one or more environmental sensors at one or more additional reference devices at known locations; and
   determining an approximate position based, at least in part, on a comparison of said characteristics of said first signals with said characteristics of said second signals and said characteristics of said additional signals.

14. The method of claim 13, wherein determining said approximate position comprises weighting signals from said one or more additional reference devices or weighting said known locations of said one or more additional reference devices.

15. The method of claim 13, wherein said approximate position is determined based, at least in part, on said comparison of said characteristics of said first signals with said characteristics of said second signals and said characteristics of said additional signals in connection with a proximity measure associated with said first signals.

16. The method of claim 15, wherein said proximity measure comprises a proximity score based, at least in part, on a probability of said mobile device being proximate to said one or more additional reference devices.

17. The method of claim 15, and further comprising:
   determining a degree of match of said characteristics of said first signals with said characteristics of said additional signals; and
   determining said proximity measure based, at least in part, on said degree of match.

18. The method of claim 1, and further comprising at least one of the following: performing at least one check-in operation with respect to said mobile device based, at least in part, on said comparison; performing at least one check-out operation with respect to said mobile device based, at least in part, on said comparison; or any combination thereof.

19. The method of claim 1, wherein said one or more sensors at said mobile device comprise a plurality of sensors, at least two of said plurality of sensors being configured to measure different environmental attributes, and wherein said comparing comprises comparing characteristics of signals generated by said plurality of sensors with characteristics of signals generated by a plurality of sensors at said reference device or a plurality of sensors at two or more reference devices.

20. An apparatus comprising:
   receiving means for receiving characteristics of first signals generated by one or more means for sensing environmental attributes at a mobile device positioned at an initial location, said characteristics of said first signals being measured via said mobile device;
   receiving means for receiving characteristics of second signals generated by one or more means for sensing environmental attributes at a reference device at a known location, said characteristics of said second signals being measured via said reference device;
   comparison means for comparing said characteristics of said first signals with said characteristics of said second signals that were generated substantially contemporaneously to determine potential matches of said first signals with said second signals; and determination means for narrowing said potential matches of said first signals with said second signals to determine that said mobile device is at least proximate to said known location based, at least in part, on said comparison and said initial location of said mobile device.

21. The apparatus of claim 20, wherein said one or more means for sensing environmental attributes at said mobile device or at said reference device comprises at least one of the following: a radio frequency (RF) receiver; a magnetometer; an ambient light detector; a camera imager; a microphone; a temperature sensor; an atmospheric pressure sensor; or any combination thereof.

22. The apparatus of claim 20, and further comprising:
determination means for determining a degree of match of said first signals with said second signals; and
determination means for determining a proximity of said mobile device to said known location based, at least in part, on said degree of match.

23. The apparatus of claim 20, and further comprising determination means for determining a time said mobile device has spent in an area proximate to said known location based, at least in part, on said comparison.

24. The apparatus of claim 20, and further comprising tracking means for tracking movement of said mobile device based, at least in part, on said comparison.

25. The apparatus of claim 20, and further comprising:
receiving means for receiving measurements from one or more means for sensing at least two different environmental attributes of each of a plurality of reference devices having a known location, wherein said measurements from said plurality of said reference devices were generated substantially contemporaneously with said measurements from said mobile device; and
proximity means for determining an approximate location of said mobile device based, at least in part, on a comparison of said measurements from said mobile device with said measurements from at least one of said plurality of reference devices.

26. The apparatus of claim 25, wherein said measurements are periodically received from said each of said plurality of reference devices.

27. The apparatus of claim 20, wherein said characteristics of said first and said characteristics of said second signals comprises a fingerprint of a wireless environment.

28. The apparatus of claim 27, wherein said fingerprint comprises a time-varying fingerprint obtained within a relatively dynamic signal environment.

29. The apparatus of claim 20, wherein said characteristics of said second signals were generated within a second of said characteristics of said first signals being generated.

30. The apparatus of claim 20, and further comprising transmitting means for transmitting a request to said reference device in response to said receiving said characteristics of said first signals or in response to receiving a request from said mobile device, wherein said characteristics of said second signals are received in response to said transmitted request.

31. The apparatus of claim 20, and further comprising:
receiving means for receiving characteristics of additional signals generated by one or more means for sensing environmental attributes at one or more additional reference devices at known locations; and
determination means for determining an approximate position based, at least in part, on a comparison of said characteristics of said first signals with said characteristics of said second signals and said characteristics of said additional signals.

32. The apparatus of claim 31, wherein said approximate position is determined in connection with a proximity score based, at least in part, on a probability of said mobile device being proximate to said one or more additional reference devices.

33. The apparatus of claim 32, and further comprising:
determination means for determining a degree of match of said characteristics of said first signals with said characteristics of said additional signals; and
determination means for determining said proximity score based, at least in part, on said degree of match.

34. An apparatus comprising:
a communication interface; and
a processor configured to:
receive characteristics of first signals generated by one or more environmental sensors at a mobile device positioned at an initial location, said characteristics of said first signals being measured via said mobile device;
receive, via said communication interface, characteristics of second signals generated by one or more environmental sensors at a reference device at a known location, said characteristics of said second signals being measured via said reference device;
compare said characteristics of said first signals with said characteristics of said second signals that were generated substantially contemporaneously to determine potential matches of said first signals with said second signals; and
narrow said potential matches of said first signals with said second signals to determine that said mobile device is at least proximate to said known location based, at least in part, on said comparison and said initial location of said mobile device.

35. The apparatus of claim 34, wherein said processor is further configured to:
determine a degree of match of said first signals with said second signals; and
determine a proximity of said mobile device to said known location based, at least in part, on said degree of match.

36. The apparatus of claim 34, wherein said processor is further configured to:
determine a time said mobile device has spent in an area proximate to said known location based, at least in part, on said comparison.

37. he apparatus of claim 34, wherein said processor further to:
track movement of said mobile device based, at least in part, on said comparison.

38. The apparatus of claim 34, wherein said characteristics of said first and said second signals comprises a fingerprint of a wireless environment.

39. The apparatus of claim 34, wherein said processor is further configured to:
transmit a request to said reference device in response to said receipt of said characteristics of said first signals or in response to a receipt of a request from said mobile device, wherein said characteristics of said second signals are received in response to said transmitted request.

40. A non-transitory storage medium having instructions stored thereon executable by a special purpose computing platform to:
compare characteristics of first signals generated by one or more environmental sensors at a mobile device positioned at an initial location with characteristics of second signals generated by one or more environmental sensors at a reference device at a known location to determine potential matches of said first signals with said second signals, wherein said first signals were generated substantially contemporaneously with said second signals and wherein said characteristics of said first signals being measured via said mobile device and said characteristics of said second signals being measured via said reference device; and narrowing said potential matches of said first signals with said second signals to determine that said mobile device is at least proximate to said known location based, at least in part, on said comparison and said initial location of said mobile device.

* * * * *